Oct. 4, 1955    R. I. BRAY ET AL    2,719,779
PROCESS OF MAKING HARD CARBON BLACK PELLETS
Filed Jan. 11, 1950
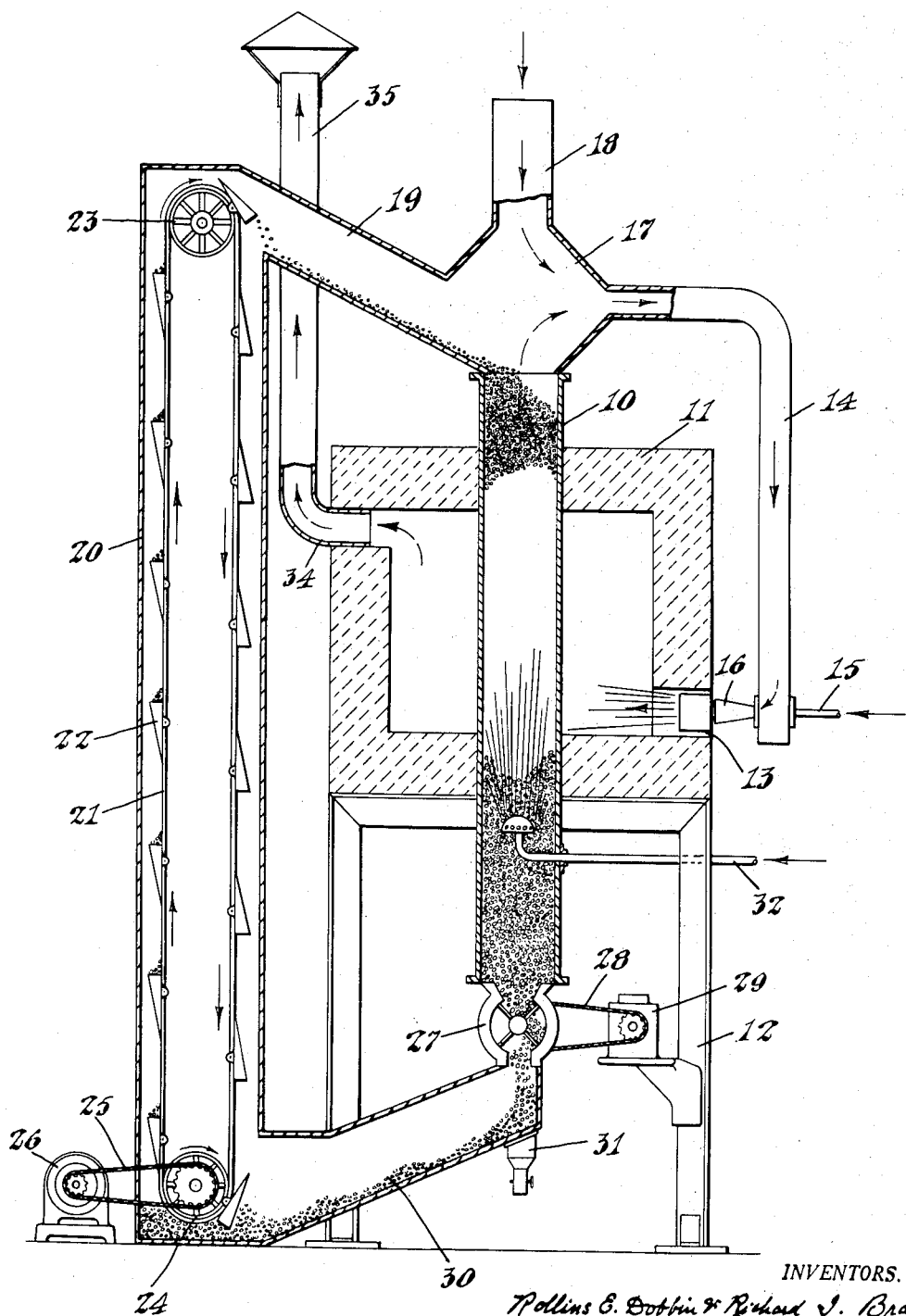
INVENTORS.
Rollins E. Dobbin & Richard I. Bray
BY
Kenway, Jenney, Witter & Hildreth.
Attys.

United States Patent Office 2,719,779
Patented Oct. 4, 1955

2,719,779

PROCESS OF MAKING HARD CARBON BLACK PELLETS

Richard I. Bray, Guymon, Okla., and Rollins E. Dobbin, Stoneham, Mass., assignors to Godfrey L. Cabot, Inc., Boston, Mass., a corporation of Massachusetts Application January 11, 1950, Serial No. 137,924

7 Claims. (Cl. 23—209.1)

This invention relates to novel carbon products and more particularly to high purity hard, dense, electrically conductive essentially carbon black granules made from gaseous or liquid hydrocarbons.

This application is a continuation-in-part of our copending application Serial No. 785,596 filed November 13, 1947 now abandoned in favor of the present application.

There has long been a need in the metallurgical and electrical industries for an inexpensive, high purity carbon readily useable as produced and which will not require substantial further processing for adaptation. The need is particularly acute in the production of high quality steel where the quality and character of the carburizing carbon used greatly affects processing conditions. Heretofore, when pig iron is not available, it has been necessary to utilize carbon as found in coke, which is physically of sufficient density and cohesiveness to remain in the melt and which may easily be assimilated by the molten metal. Coke, however, contains a number of impurities which must be removed as an additional processing step and this removal is expensive and time consuming. The novel carbon product of our invention is a superior carburizing agent in the production of steel possessing as it does the essential physical characteristics of density, strength and assimilability while being at the same time free of all undesirable impurities.

The novel carbon product of our invention is likewise valuable for use in carbon electrodes, being highly conductive and of high purity. It approaches graphite in conductivity and its carbon purity far exceeds all but the most expensive artificially produced graphites.

Although carbon black produced by the conventional channel, furnace or thermal processes is the purest form of carbon known, its inherent characteristics make it unuseable either in steel production or for electrodes. It is so light and dusty that it cannot be introduced into molten steel; neither is it a good conductor of electricity. Even when agglomerated or pelletized by any well known process, as for example, by such process as that disclosed in U. S. Letters Patent #2,131,686, Heller and Snow, to the maximum practicable obtainable bulk density of about 28 lbs./cu. ft. and to approximately 8–40 mesh size, or by ball milling to a density as high as 40 lbs./cu. ft., carbon black is not useable in a steel melt because such pellets are physically too weak to hold together long enough to be of any effect. Such pellets disintegrate instantly at melt temperatures and blow up when subjected to the impact of the fast-moving, rapidly-expanding gases issuing from the melt. Carbon black so returned to its pulverulent condition has no appreciable carburizing effect because the carbon black is so reactive in the oxidizing atmosphere of the melt that it burns up before it can combine with the metal.

As we have said, carbon black agglomerated by any of the commercially practicable dry methods cannot be densified appreciably beyond a maximum of about 28 lbs./cu. ft. although the true density of the carbon itself is around 118 lbs./cu. ft. The reason for this becomes obvious upon examination of the carbon black particles as they are when first produced. The average diameter of the individual particles of semi-reinforcing furnace (SRF) black, the coarsest of furnace blacks, for example, is in the neighborhood of 700 Angstrom units. Each particle in turn is composed of myriad quasigraphitic crystallites or platelets in the order of 12 Å. thick and 20 Å. in cross section. The particle itself thus has a substantial surface area on which is adsorbed volatile matter. At temperatures below about 1400° F., this volatile matter adheres tenaciously to the surface of the particles and is not removed by impact. Because of this volatile content of the particles and also because of their structure no amount of agitation with or without the addition of a liquid wil cause the particles of carbon black to pack closely together and to densify beyond the amounts previously noted.

We have found, however, that when carbon black pellets which have been formed as previously described are heated to above about 1400° F., in the absence of oxygen but while subjected to a current of vaporized liquid or gaseous hydrocarbon most of the volatile matter is driven off, new carbon is deposited within and upon the original pellets and at the same time the crystallites within the individual particles are caused to grow and become more ordered as we shall describe in more detail hereinafter.

It is the principal object of our invention to produce essentially carbon black pellets having a carbon purity of 99.5% or higher which will have greater cohesive strength and hardness than has heretofore been obtainable, and which will be of sufficiently low reactivity to combine with iron at melt temperatures.

It is also an object of our invention to provide a carbon product, being essentially carbon black, which will possess electrical conductivity at least equal to the best non-graphitic electrical carbons.

We accomplish these and other objects of our invention by subjecting carbon black which has first been agglomerated by any convenient method into cohesive, essentially porous pellets, to a current of vaporized liquid or gaseous hydrocarbon while maintaining the pellets in a zone heated to above the dissociation temperature of the hydrocarbon, preferably to at least about 1800° F. The carbon dissociated from the hydrocarbon is deposited within and upon the pellets which are partially calcined at the same time. The resulting product consists of essentially carbon black pellets the particles of which are cemented together internally by glance carbon and being of substantially the same size but of greater density and enormously greater strength than the original untreated carbon black pellets and of greatly enhanced electrical conductivity. By reason of the addition of hard glance carbon thereto, discussed hereinafter, the new pellets of our invention are hard and brittle, so much so that the pellets cannot be compressed to any appreciable degree but will shatter into many pieces when struck with a hard implement or when loaded with sufficient weight.

The amount of new carbon that will be added to the original carbon black pellets during any given period of time is a factor of the conjoint conditions of contact time, rate of hydrocarbon flow, reaction zone temperature and degree of carbon saturation of the pellet. Because the newly formed carbon is deposited principally within the interstices of the individual pellet matrix the ability of the pellet to take on additional carbon must necessarily be limited by the capacity of the pellet to hold it. Consequently, the rate of carbon addition becomes progressively slower as the interstices of the pellet fill up and the pellet densifies until the saturation point is reached and no further carbon depositions takes place except on the outer surface thereof. The process of our invention can of course be stopped at any point prior to pellet saturation and we have obtained thereby carbon pellets having bulk densities, measured in terms of weight per unit volume, of between about 30 and 60 lbs./cu. ft.

Indicative of the extent to which carbon has been added to the original pellets is the cohesive strength and and hardness of the finished product. The correlation of these newly-acquired properties appears to be directly relative and, in general, the denser pellet will be the stronger and harder pellet.

Although there has been no entirely satisfactory test by which to determine the cohesive strength and hardness of the agglomerates in the density ranges herein considered we have found that the resistance of those agglomerates to crushing furnishes a fair measure of such properties. Accordingly, a crush test has been devised employing a two pan torsion balance having pans mounted above the balance beam. One pan was loaded with a flask and the other with an equivalent counterbalancing weight. Twenty pellets were selected at random from each lot of material to be tested and placed, one at a time, on the beam arrest below the pan containing the flask. The beam arrest was raised until contact was made between pellet and beam. A load was then gradually and evenly applied by flowing water or mercury into the flask until the pellet shattered. In the following example is set forth a comparison of median weights required to crush untreated semi-reinforcing furnace (SRF) and easy processing channel (EPC) carbon black pellets and 35, 50 and 57 lb. density composite pellets of our invention, designated M1, M2 and M3 respectively.

*Example I*

| Material | Density, Lbs./cu. ft. | Median wgt. to crush grams-average of 20 pellets |
|---|---|---|
| EPC (Rubber grade) | 22 | 4 |
| SRF (Dry pelletized) | 25 | 12 |
| SRF (Wet pelletized) | 26 | 48 |
| M1 | 35 | 524 |
| M2 | 50 | 5,566 |
| M3 | 57 | 6,990 |

It is significant to note from the results of the above tests, and such results are but the confirmation of what we had concluded from observation, that increasing the density of the carbon black pellets formed by standard agglomeration methods, including ball milling, does not effect an increase in their strength and hardness in any important amount at least so far as metallurgical use is concerned. On the other hand, the pellets of our invention show a tremendous increase in these properties as their densities are increased.

This great increase in strength and hardness we attribute principally to the new carbon deposited within and on the original carbon black pellets. As we have said, such pellets being microscopically porous present an extensive particulate surface on which the newly formed carbon may deposit. This new carbon by the very manner of its formation is not entirely carbon black but is, in part at least, probably something akin to microcrystalline graphite which has been termed "glance" carbon. This glance carbon is hard and tough and appears to act as a cement in binding together the individual particles within the pellet. As will appear below, some of the new carbon is undoubtedly in the form of carbon black and the remainder is glance carbon. In any event, whatever it may be called, the new carbon is equal to conventional carbon black in purity and has served to cement together the particles of each individual pellet to make it hard and strong.

Although it has been proposed to agglomerate carbon black with a pure carbonaceous liquid binder and thereafter to heat the resulting agglomerates to char or crack the binder to carbon, we have been unable to produce by such method carbon pellets of purity and physical properties even remotely equivalent to the products of our invention.

To make a conductive carbon black by the process of our invention, it is necessary to operate the process only for a short time; when bulk density has been increased by only a pound or two per cubic foot, our composite carbon black pellets become highly conductive. Extensive further exposure to dissociating hydrocarbon merely increases bulk density without substantially increasing conductivity. On the other hand, the density of the final product determines its ultimate electrical use.

When large surface area and high electrolyte retention are desirable, such as in dry cell bobbins, the product of our invention in the lowest density range is eminently suitable combining, as it does, moderate high adsorptiveness and low resistance. Contrarywise, for solid carbon electrodes high surface area and high adsorptiveness is detrimental. For such use the more dense carbon blacks of our invention are very valuable. The composite pellets of this invention will be good conductors in any event, the ultimate densities may be selected with view to the required physical properties. In the following example is set forth a comparison of the electrical properties of 35 and 50 lb. density products of our invention designated M1 and M2 respectively, untreated and calcined carbon black and graphite.

*Example II*

| Material | Specific Resistance, Ohms/per cu. inch |
|---|---|
| Commercial Graphite (95-98% purity) | 0.00032 |
| M2 (50 lb. density) | 0.076 |
| M1 (35 lb. density) | 0.132 |
| EPC (carbon black calcined 1 hr. @ 2400° F.) | 0.25 |
| SRF (carbon black untreated) | 0.55 |

We are uncertain as to the exact reason why the product of our invention should be conductive when the original carbon black from which it is produced is so poor a conductor but from observed effects we reason as follows: Most of the newly produced carbon, as we have said above, is in the form of glance carbon, probably deposited in layers no more than a few molecules deep. This glance carbon consists of needle-like crystals, sufficient numbers of which must so orient themselves as to form a conductive bridge through and over the surface of each individual particle. This glance carbon deposition does not, however, alter the essentially turbostratic nature of the carbon particles.

Biscoe and Warren in "An X-Ray Study of Carbon Black," J. Appl. Phys. 13, No. 6, 384, June 1942, point out that carbon black is neither a crystalline nor an amorphous substance but is something intermediate, having a structure which they term "Turbostratic" (unordered layers). This turbostratic structure is characterized by the symmetrical orientation of the carbon atoms within the two-dimensional layer and by the lack of symmetry in the third dimension. The novel carbon product of our invention is likewise turbostratic as is shown in the following example in which is set forth a comparison of layer dimensions in Angstrom units, calculated from X-ray diffraction patterns of a 50 lb. density sample (M-2), of conventional carbon black and of so-called coke formed in a carbon black producing furnace.

In general, the higher L values indicate more advanced stages of graphitization.

Example III

| Material | Lc[1] | La[2] |
|---|---|---|
| Semi-reinforcing furnace carbon black | 15.5 | 26.7 |
| Furnace Coke | 40.2 | 86.8 |
| M2 (50 lb. density) | 20.6 | 35.9 |
| SRF calcined 2 hrs.: | | |
| at 1,121° C | 17.9 | 29.2 |
| at 1,316° C | 24.8 | 43.4 |

[1] Lc—Dimension perpendicular to layer normal (thickness of crystallite).
[2] La—Dimension across the layers.

In the manufacture of high quality steel the purity of the carbon used is of prime importance. No carburizer now in general usage of which we are aware closely approximates the purity of the carbons of our invention. Carbon black as first produced is of the same order of purity but, as we have said, cannot be incorporated in the steel melt, even in any pelletized form heretofore available, because of the physical limitations referred to above. On the other hand, the carbons of our invention in the bulk density range above about 35#/cu.ft. may readily be introduced into the melt and will be completely absorbed. Not only is carbon transfer to the steel more efficient than with any other carburizer now used, but also there are no impurities carried in which must be removed subsequently. In addition the carbon pellets of our invention are easy to handle, are compact and do not require extensive storage space, are tough and non-dusting, will flow freely and can be air conveyed or poured by gravity through any convenient conduit into the melt.

The products of our invention may be made by any convenient method in which a gaseous or vaporized hydrocarbon is conducted through a feed stock mass of porous and friable carbon black pellets made by any of the well known agglomeration processes and maintaining the pellet mass at or above the dissociation temperature of the hydrocarbon, thereby causing the hydrocarbon to dissociate and deposit within and upon the surface of the pellets to increase their strength, hardness and apparent density in the desired amount. To prevent ultimate coalescence when treated in a bed maintained at substantially uniform volume the feed stock pellets are agitated by being withdrawn from time to time and recirculated to the hot zone, the extent of recirculation being determined by the ultimate density to be obtained. The pellets may be withdrawn from further circulation at any stage of the process. Alternatively, the pellets may be maintained in a state of agitation by the well known fluidization technique for contacting solids with gases.

These and other features of our invention will be best understood and appreciated from the following description of a preferred manner of practising our novel process, described in connection with one suitable form of apparatus of a type suitable for its practice and illustrated in the accompanying drawing in which the figure is a diagrammatic representation of the apparatus shown partly in elevation and partly in longitudinal section.

The illustrated apparatus includes a ceramic reaction tube 10 mounted vertically in a furnace 11 of refractory material supported at convenient height by structural steel members 12. The furnace is provided with an inlet port 13 to which leads a duct 14. The duct 14 supplies recirculated gas and a pipe 15 supplies fresh heating gas to a burner 16 of the Venturi type by which the furnace, the reaction tube 10 and its contents may be heated.

A head 17 is supported upon and communicates with the upper end of the reaction tube 10. The duct 14 in the illustrated arrangement leads from the right-hand side of the head 17 to the inlet port 13 of the furnace. An inlet duct 18 leads vertically into the upper side of the head and supplies air necessary for combustion at the burner 16. A third duct 19 leads from the upper end of a vertical riser 20 to the right-hand side of the head, being inclined downwardly toward the upper end of the reaction tube 10 and serving to supply the latter with the granules under treatment. The riser 20 contains a conveyor 21 having buckets 22. The conveyor runs over an upper pulley 23 and a lower pulley 24, the latter being driven by a chain 25 from a motor 26.

The lower end of the reaction tube 10 is closed by a pressure-tight valve 27 having radial vanes which rotate in a cylindrical chamber. The valve is driven by a chain 28 from a motor 29 which is shown as being supported upon one of the legs of the furnace. The valve 27 which controls the flow of granules from the reaction tube leads to an inclined discharge duct 30 opening into the base of the riser 20. A draw-off valve 31 is placed in the discharge duct 30 below and in line with the valve 27 and serves as means for drawing off the finished product from time to time.

The reaction tube 10 is provided at an intermediate point, herein shown as being located just below the base of the furnace, with a gas supply pipe 32 and nozzle by which hydrocarbon gas is introduced into the bed of granules contained within the tube 10. The furnace is shown as provided with an outlet duct 34 and stack 35 by which the products of combustion are disposed of.

In carrying out the process of our invention with the assistance of the illustrated apparatus, the system is supplied through any convenient inlet, provided for example in the discharge duct 30, with dry, substantially dustless free-flowing pellets of carbon black approximately 8–40 mesh size, of apparent density of 12–28 lbs. per cu. ft. and in an amount substantially greater than the capacity of the reaction tube. The conveyor is operated until the tube has been completely filled and the furnace fired until the temperature of the tube ranges about 1400° F. and the granules therein are raised to a state of incandescence. Hydrocarbon gas such as methane or natural gas or vaporized hydrocarbon is now supplied to the incandescent bed of granules through the gas supply pipe 32. The valve 27 is slowly operated and the conveyor 21 set in motion. The result is that small charges of granules are continuously withdrawn from the bottom of the reaction tube 10 and delivered by the conveyor to its upper end. Meanwhile the gas or vaporized hydrocarbon supplied by the pipe 32 is partially decomposed and deposits as glance carbon within the granules circulating through the tube 10. The recycling action of the granules prevents excessive decomposition in localized regions in the tube and insures uniform treatment of the granules. Excess gas not decomposed in passing up through the reaction tube passes from the head 17 through the duct 14 back to the burner 16 as already explained. The recycling process may be continued until the desired pellet density has been attained. This density, as we have said, may range from 30 to about 60#/cu. ft.

The final product is dark gray in color. The granules or pellets are generally spherical in shape and hard and brittle in texture. They cannot ordinarily be crushed between the fingers and in bulk are entirely free of dust.

Ordinarily the finished product will be withdrawn from the system through the medium of the draw-off valve 31 when the process has been carried to the desired point, but it will be seen that the process could be used to bind briquettes of carbon or other material where a strong binder is desirable and wherein the high temperature is not harmful to the parent matrix.

Although the novel product of our invention bears a superficial resemblance to coke in its outward physical appearance we are satisfied that it is not coke in any sense of the word. In the first place, it is obtained by dissociation of newly introduced hydrocarbon deposited upon the particles of the original carbon black pellets and not by destructive distillation of carbon already formed. Furthermore, our new product contains no unsaturation, having no extractable materials, and is not subject to spontaneous combustion on prolonged storage as are most carbons produced by a coking or charring process. And, unlike coke, it is largely turbostratic in structure.

Thus we conclude from its various analytical properties and from what it is not that the novel product of our invention is essentially carbon black in the form of pellets to which new carbon black has been added and which have been cemented together and coated with a small amount of hard, brittle glance carbon. Examination of micro-pulverized samples of this carbon black product of various densities under the electron microscope reveals individual particles which continue to show the characteristic configuration of carbon black.

Having thus disclosed our invention and described in detail an illustrative process for producing our novel product, we claim as new and desire to secure by Letters Patent:

1. The process of making hard essentially carbon black pellets which consists in passing a hydrocarbon in the gaseous state through a mass of porous pellets of agglomerated carbon black, the pellets containing no binder, maintained in a state of agitation in an enclosed space and heated to above about 1400° F. whereby the hydrocarbon is dissociated to carbon black and glance carbon as a deposit on the surfaces of the individual particles within the pellets.

2. The process of increasing the cohesive strength and hardness of carbon black agglomerates in pellet form while maintaining carbon purity above 99% which consists in passing a hydrocarbon in the gaseous state through a mass of porous pellets of agglomerated carbon black, the pellets containing no binder and being maintained in a state of agitation in an enclosed space heated to above 1400° F. wherein the hydrocarbon is dissociated to carbon in the form of carbon black and glance carbon and deposited upon and cementing together the individual particles of each of such pellets.

3. The process of claim 2 in which the hydrocarbon is natural gas.

4. The process of claim 2 in which the hydrocarbon is a vaporized oil.

5. The process of producing pellets of substantially pure carbon which includes the steps of heating to incandescence a mass of substantially spherical friable pellets of agglomerated carbon black, having a bulk density of 12–28 lbs. per cu. ft., free of binder and containing internal interstices, continuously agitating the mass of incandescent pellets thereby preventing coalescence thereof, and meanwhile passing a gaseous hydrocarbon through the agitated mass of pellets thus decomposing the hydrocarbon and causing the deposit of glance carbon in the interstices of the pellets and on the surface thereof until the bulk density of the pellets is increased to 30–60 lbs. per cu. ft. and they become grayish in color.

6. The process of producing pellets of substantially pure carbon by the process defined in claim 5 further characterized by the step of agitating the pellets by recirculating them to and from the zone in which they are reduced to incandescence.

7. The process of producing hard, unreactive pellets of substantially pure carbon which consists in heating to above about 1400° F. a mass of substantially spherical, friable and porous pellets of carbon black having a bulk density of 12–28 lbs. per cu. ft., free of binder, passing a gaseous hydrocarbon through the mass of pellets, thereby agitating the mass, decomposing the hydrocarbon and causing the deposit of carbon black and glance carbon upon the particles of the pellet and upon the surface of the pellet until the bulk density of the pellets is increased to 30–60 lbs. per cu. ft., and they become grayish in color.

References Cited in the file of this patent

UNITED STATES PATENTS

| | | |
|---|---|---|
| 935,180 | Williamson | Sept. 28, 1909 |
| 1,156,509 | Weintraub et al. | Oct. 12, 1915 |
| 1,259,121 | Mott | Mar. 12, 1918 |
| 1,501,108 | Hamister | July 15, 1924 |
| 2,134,950 | Offutt | Nov. 1, 1938 |
| 2,392,682 | Marek | Jan. 8, 1946 |
| 2,499,438 | Wiegand | Mar. 7, 1950 |
| 2,518,211 | Wiegand et al. | Aug. 8, 1950 |
| 2,564,700 | Krejci | Aug. 21, 1951 |

FOREIGN PATENTS

| | | |
|---|---|---|
| 550,379 | Great Britain | Jan. 5, 1943 |
| 118,922 | Australia | Sept. 5, 1944 |